United States Patent
Kobashi et al.

(10) Patent No.: US 11,208,936 B2
(45) Date of Patent: Dec. 28, 2021

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Noriyasu Kobashi, Hachioji (JP); Noriyasu Adachi, Numazu (JP); Yusuke Saito, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 16/784,738

(22) Filed: Feb. 7, 2020

(65) Prior Publication Data

US 2020/0256238 A1      Aug. 13, 2020

(30) Foreign Application Priority Data

Feb. 12, 2019   (JP) .............................. JP2019-023027

(51) Int. Cl.
*F01N 11/00*       (2006.01)
*F01N 3/021*       (2006.01)
*F01P 3/02*        (2006.01)

(52) U.S. Cl.
CPC .............. *F01N 11/00* (2013.01); *F01N 3/021* (2013.01); *F01P 3/02* (2013.01); *F01P 2003/021* (2013.01); *F01P 2025/31* (2013.01)

(58) Field of Classification Search
CPC ... F01N 11/00; F01N 3/021; F01P 3/02; F01P 2003/021; F01P 2025/31
See application file for complete search history.

(56) References Cited

U.S. PATENT DOCUMENTS

| | | | |
|---|---|---|---|
| 10,156,175 B1* | 12/2018 | Hattar | F01N 9/002 |
| 2010/0286930 A1* | 11/2010 | Onishi | F02D 41/1467 |
| | | | 702/24 |
| 2012/0060482 A1* | 3/2012 | Gonze | F01N 3/031 |
| | | | 60/287 |
| 2018/0113963 A1* | 4/2018 | Kordon | G06F 30/20 |

FOREIGN PATENT DOCUMENTS

| | | |
|---|---|---|
| JP | 2012-149524 | 8/2012 |
| JP | 5464151 | 4/2014 |

\* cited by examiner

*Primary Examiner* — Jacob M Amick
(74) *Attorney, Agent, or Firm* — Finnegan, Henderson, Farabow, Garrett & Dunner, LLP

(57) ABSTRACT

An exhaust purification system of an internal combustion engine comprises a filter 23 arranged in an exhaust passage 23 of an internal combustion engine in which a plurality of cylinders 61, 62, 63, 64 cooled by cooling water are provided and trapping particulate matter in exhaust gas, a wall temperature calculation part 51 configured to calculate or detect wall temperatures of a predetermined number of equal to or more than two cylinders among the plurality of cylinders, and a PM amount calculation part 52 configured to calculate an amount of particulate matter discharged from the plurality of cylinders to the exhaust passage based on the wall temperatures calculated or detected by the wall temperature calculation part.

11 Claims, 10 Drawing Sheets

FIG. 1
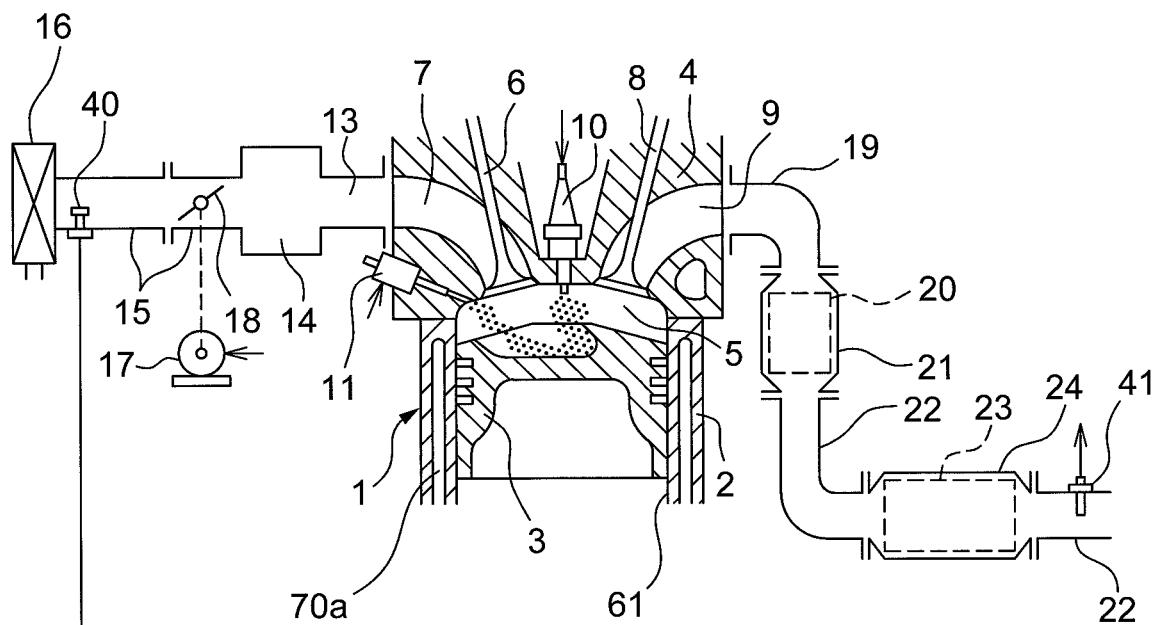
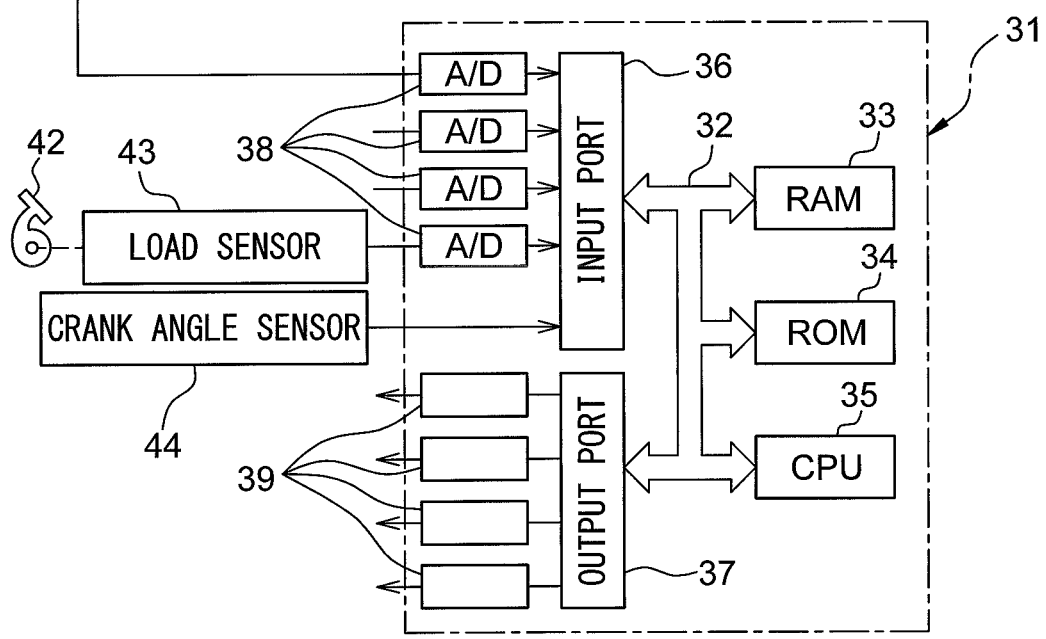

EXHAUST PURIFICATION SYSTEM OF INTERNAL COMBUSTION ENGINE

FIELD

The present invention relates to an exhaust purification system of an internal combustion engine.

BACKGROUND

In the past, to improve exhaust emissions, it has been known to provide a filter for trapping particulate matter (PM) in exhaust gas in an exhaust passage of an internal combustion engine.

However, if the amount of PM deposited on the filter increases, the filter will clog and the back pressure will rise. For this reason, when the amount of deposition of PM is great, to prevent damage to the internal combustion engine, sometimes it becomes necessary to limit the output of the internal combustion engine etc. Further, when the amount of deposition of PM is great, if the PM on the filter is burned off, the temperature of the filter will excessively rise and the filter is liable to deteriorate.

For this reason, to suitably control an internal combustion engine in accordance with the amount of deposition of PM, it is desirable to precisely estimate the amount of deposition of PM. When the exhaust gas passes through the filter, the greater the amount of PM in the exhaust gas, the greater the amount of PM deposited on the filter becomes. For this reason, to precisely detect the amount of deposition of PM, it is necessary to estimate the amount of PM discharged into the exhaust passage.

In this regard, PTL 1 describes calculating the amount of PM discharged into the exhaust passage based on at least one of the amount of fuel injection, oxygen concentration, exhaust temperature, fuel injection pressure, and cylinder inside temperature.

CITATIONS LIST

[Patent Literature]
[PTL 1] Japanese Unexamined Patent Publication No. 2012-149524

SUMMARY

Technical Problem

However, if an internal combustion engine is provided with a plurality of cylinders, sometimes the temperature will differ among the cylinders. For example, if cooling water circulates around the cylinders, the heat inside the cylinders will warm the cooling water. For this reason, in cylinders late in the order of being passed by the cooling water, the cooling effect by the cooling water will become smaller. As a result, when in particular the temperature of the cooling water is low, the temperature difference among the cylinders will become larger. Therefore, if the amount of discharge of PM is calculated from the temperature of one cylinder, the precision of calculation will fall due to the difference in wall temperatures among the cylinders.

Therefore, in consideration of the above problem, an object of the present invention is to improve a precision of calculation of an amount of particulate matter discharged from a plurality of cylinders to an exhaust passage if an internal combustion engine is provided with a plurality of cylinders.

Solution to Problem

The summary of the present disclosure is as follows.

(1) An exhaust purification system of an internal combustion engine comprising: a filter arranged in an exhaust passage of an internal combustion engine in which a plurality of cylinders cooled by cooling water are provided and trapping particulate matter in exhaust gas; a wall temperature calculation part configured to calculate or detect wall temperatures of a predetermined number of equal to or more than two cylinders among the plurality of cylinders; and a PM amount calculation part configured to calculate an amount of particulate matter discharged from the plurality of cylinders to the exhaust passage based on the wall temperatures calculated or detected by the wall temperature calculation part.

(2) The exhaust purification system of an internal combustion engine described in above (1), the wall temperature calculation part is configured to calculate or detect the wall temperatures of the plurality of cylinders.

(3) The exhaust purification system of an internal combustion engine described in above (1) or (2), wherein the wall temperature calculation part is configured to calculate the wall temperatures of the predetermined number of cylinders so that processing load becomes higher if judging that an absolute value of an amount of change of the wall temperature per unit time of at least one cylinder among the plurality of cylinders is larger than a predetermined value, compared to if judging that the absolute value is smaller than the predetermined value.

(4) The exhaust purification system of an internal combustion engine described in above (3), wherein the wall temperature calculation part is configured to calculate the wall temperatures of the predetermined number of cylinders if judging that the absolute value is larger than the predetermined value and calculate the wall temperatures of less than the predetermined number of cylinders among the plurality of cylinders if judging that the absolute value is smaller than the predetermined value.

(5) The exhaust purification system of an internal combustion engine described in above (4), wherein the wall temperature calculation part is configured to calculate the wall temperatures of the plurality of cylinders if judging that the absolute value is larger than the predetermined value and calculate the wall temperature of one cylinder among the plurality of cylinders if judging that the absolute value is smaller than the predetermined value.

(6) The exhaust purification system of an internal combustion engine described in above (5), wherein the internal combustion engine is provided with equal to or more than three cylinders and one cylinder among the plurality of cylinders is a cylinder other than the cylinder which the cooling water first passes and the cylinder which the cooling water last passes.

(7) The exhaust purification system of an internal combustion engine described in above (3), wherein the wall temperature calculation part is configured to calculate the wall temperatures of the predetermined number of cylinders by a method of processing with a relatively high processing load if judging that the absolute value is larger than the predetermined value and calculate the wall temperatures of the predetermined number of cylinders by a method of processing with a relatively low processing load if judging that the absolute value is smaller than the predetermined value.

(8) The exhaust purification system of an internal combustion engine described in above (7), wherein the wall temperature calculation part is configured to calculate the wall temperatures of the plurality of cylinders by a method of processing with a relatively high processing load if judging that the absolute value is larger than the predetermined value and calculate the wall temperatures of the plurality of cylinders by a method of processing with a relatively low processing load if judging that the absolute value is smaller than the predetermined value.

(9) The exhaust purification system of an internal combustion engine described in any one of above (3) to (8), wherein the wall temperature calculation part is configured to judge that the absolute value of the amount of change of the wall temperature per unit time of the at least one cylinder is larger than the predetermined value if warm-up of the internal combustion engine has not been completed.

(10) The exhaust purification system of an internal combustion engine described in any one of above (3) to (9), wherein the wall temperature calculation part is configured to judge that the absolute value of the amount of change of the wall temperature per unit time of the at least one cylinder is larger than the predetermined value if fuel cut control for stopping supply of fuel to the plurality of cylinders is performed continuously for equal to or more than a predetermined time.

Advantageous Effects of Invention

According to the present invention, it is possible to improve a precision of calculation of an amount of particulate matter discharged from a plurality of cylinders to an exhaust passage if an internal combustion engine is provided with a plurality of cylinders.

BRIEF DESCRIPTION OF DRAWINGS

FIG. 1 is a view schematically showing an internal combustion engine to which an exhaust purification system of an internal combustion engine according to a first embodiment of the present invention is applied.

DESCRIPTION OF EMBODIMENTS

Figure 2:
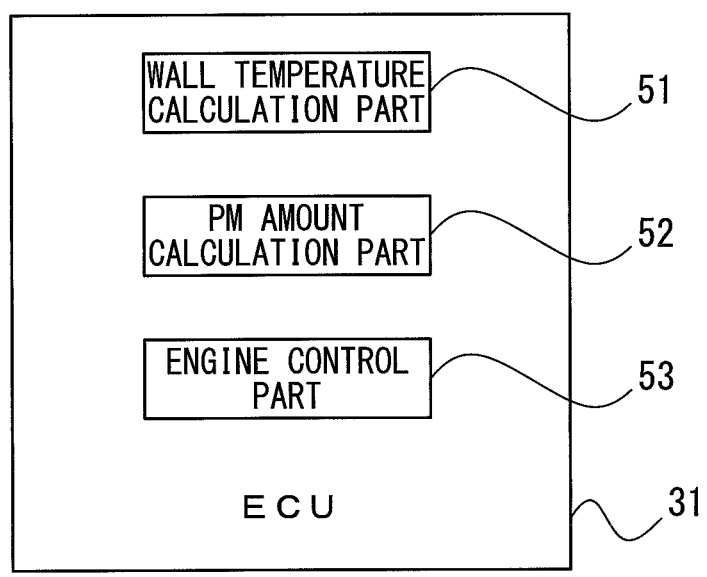
FIG. 2 is a functional block diagram of an ECU.

Below, referring to the drawings, embodiments of the present invention will be explained in detail. Note that, in the following explanation, similar component elements are assigned the same reference numerals.

First Embodiment

Below, referring to FIG. 1 to FIG. 7, a first embodiment of the present invention will be explained.
<Configuration of Internal Combustion Engine>
FIG. 1 is a view schematically showing an internal combustion engine to which an exhaust purification system of an internal combustion engine according to the first embodiment of the present invention is applied. The internal combustion engine is a spark ignition type internal combustion engine, specifically, a gasoline engine fueled by gasoline. The internal combustion engine is mounted in a vehicle.

The internal combustion engine is provided with an engine body 1 including a cylinder block 2 and a cylinder head 4. Inside the cylinder block 2, a plurality of cylinders are formed. In the present embodiment, the number of the cylinders is four. In FIG. 1, only a first cylinder 61 is shown. In the cylinders, pistons 3 reciprocating in the axial directions of the cylinders are arranged. Between the pistons 3 and cylinder head 4, combustion chambers 5 are formed.

The cylinder head 4 is formed with intake ports 7 and exhaust ports 9. The intake ports 7 and exhaust ports 9 are connected to the combustion chambers 5. The internal combustion engine is further provided with intake valves 6 and exhaust valves 8 arranged in the cylinder head 4. The intake valves 6 open and close the intake ports 7, while the exhaust valves 8 open and close the exhaust ports 9.

The internal combustion engine is further provided with spark plugs 10 and fuel injectors 11. The spark plugs 10 are arranged at the center parts of the inside wall surfaces of the cylinder head 4 and generate sparks in response to ignition signals. The fuel injectors 11 are arranged at the peripheral parts of the inside wall surfaces of the cylinder head 4 and inject fuel into the combustion chambers 5 in response to injection signals. In the present embodiment, as the fuel, gasoline with a stoichiometric air-fuel ratio of 14.6 is used.

The internal combustion engine is further provided with intake runners 13, a surge tank 14, intake pipe 15, air cleaner 16, and throttle valve 18. The intake ports 7 of the cylinders are respectively connected through corresponding intake runners 13 to the surge tank 14. The surge tank 14 is connected through the intake pipe 15 to the air cleaner 16. The intake ports 7, intake runners 13, surge tank 14, intake pipe 15, etc., form an intake passage guiding air to the combustion chambers 5. The throttle valve 18 is arranged inside the intake pipe 15 between the surge tank 14 and air cleaner 16 and is driven by a throttle valve drive actuator 17 (for example, DC motor). The throttle valve 18 is made to turn by the throttle valve drive actuator 17, whereby it is possible to change the open area of the intake passage corresponding to the opening degree.

The internal combustion engine is further provided with an exhaust manifold 19, exhaust pipe 22, catalyst 20, and filter 23. The exhaust ports 9 of the cylinders are connected to the exhaust manifold 19. The exhaust manifold 19 has a plurality of branch parts connected to the exhaust ports 9 and a plenum where these branch parts are collected. The plenum of the exhaust manifold 19 is connected to an upstream side casing 21 having the catalyst 20 built into it. The upstream side casing 21 is connected through the exhaust pipe 22 to a downstream side casing 24 having the filter 23 built into it. The exhaust ports 9, exhaust manifold 19, upstream side casing 21, exhaust pipe 22, downstream side casing 24, etc., form an exhaust passage discharging exhaust gas generated by combustion of the air-fuel mixture in the combustion chambers 5.

The various control operations of the internal combustion engine are performed by an electronic control unit (ECU) 31 based on the outputs of various types of sensors provided at the internal combustion engine etc. The ECU 31 is comprised of a digital computer provided with components connected with each other through bidirectional buses 32 such as a RAM (random access memory) 33, ROM (read only memory) 34, CPU (microprocessor) 35, input port 36, and output port 37. The ECU 31 is one example of a control device of the internal combustion engine.

The ECU 31 receives as input the outputs of various types of sensors. In the present embodiment, outputs of an air flow meter 40, temperature sensor 41, load sensor 43, and crank angle sensor 44 are input to the ECU 31.

The air flow meter 40 is arranged in the intake passage, specifically inside the intake pipe 15 at the upstream side from the throttle valve 18. The air flow meter 40 detects the amount of flow of the air flowing through the intake passage. The air flow meter 40 is electrically connected to the ECU 31. The output of the air flow meter 40 is input through a corresponding AD converter 38 to the input port 36.

The temperature sensor 41 is arranged in the exhaust passage at the downstream side from the filter 23 (specifically, the exhaust pipe 22) and detects the temperature of the exhaust gas flowing out from the filter 23. The temperature sensor 41 is electrically connected to the ECU 31. The output of the temperature sensor 41 is input through a corresponding AD converter 38 to the input port 36.

The load sensor 43 is connected to an accelerator pedal 42 provided at the vehicle mounting the internal combustion engine and detects the amount of depression of the accelerator pedal 42. The load sensor 43 is electrically connected to the ECU 31. The output of the load sensor 43 is input through a corresponding AD converter 38 to the input port 36. The CPU 35 calculates the engine load based on the output of the load sensor 43.

The crank angle sensor 44 generates an output pulse each time a crankshaft of the internal combustion engine rotates by a predetermined angle (for example, 15 degrees). The crank angle sensor 44 is electrically connected to the ECU 31. The output of the crank angle sensor 44 is input to the input port 36. The CPU 35 calculates the engine speed based on the output of the crank angle sensor 44.

On the other hand, the output port 37 is connected through corresponding drive circuits 39 to the spark plugs 10, fuel injectors 11, and throttle valve drive actuator 17. The CPU 35 controls these. Specifically, the CPU 35 controls the ignition timings of the spark plugs 10, the injection timings and injection amounts of the fuel injected from the fuel injectors 11, and the opening degree of the throttle valve 18.

<Exhaust Purification System of Internal Combustion Engine>

Below, an exhaust purification system of an internal combustion engine according to the first embodiment of the present invention (below, referred to simply as the "exhaust purification system") will be explained.

The exhaust purification system is provided with a catalyst 20 and a filter 23 arranged in an exhaust passage of the internal combustion engine. As shown in FIG. 1, the catalyst 20 is arranged in the exhaust passage at the upstream side from the filter 23. The catalyst 20 removes the harmful substances in the exhaust gas. For example, the catalyst 20 is a three-way catalyst which can simultaneously remove hydrocarbons (HC), carbon monoxide (CO), and nitrogen oxides ($NO_x$) in the exhaust gas.

The filter 23 traps particulate matter (PM) in the exhaust gas. In the present embodiment, the filter 23 is a gasoline particulate filter (GPF).

If exhaust gas containing PM flows into the filter 23, the PM is captured by the filter 23 and the PM deposits on the filter 23. If the amount of PM deposited on the filter 23 becomes greater, closure (clogging) of the filter 23 occurs. As a result, the discharge of exhaust gas through the filter 23 is obstructed and the back pressure increases.

On the other hand, if oxygen is supplied to the filter 23 when the temperature of the filter 23 is high, the PM deposited on the filter 23 is oxidized and burned off. This phenomenon is called "regeneration" of the filter 23. By regenerating the filter 23, the amount of PM deposited on the filter 23 decreases.

The exhaust purification system is further provided with a wall temperature calculation part 51, a PM amount calculation part 52 and an engine control part 53. FIG. 2 is a functional block diagram of the ECU 31. In the present embodiment, the ECU 31 has the wall temperature calculation part 51, the PM amount calculation part 52 and the engine control part 53. The wall temperature calculation part 51, the PM amount calculation part 52 and the engine control part 53 are functional blocks realized by a program stored in the ROM 34 of the ECU 31 run by the CPU 35 of the ECU 31.

The PM amount calculation part 52 calculates the amount of PM discharged from the plurality of cylinders provided at the internal combustion engine to the exhaust passage (below, referred to as the "total amount of PM discharge"), that is, the amount of PM discharged from the engine body 1 to the exhaust passage. PM is produced by incomplete combustion of fuel in the combustion chambers 5. Further, the lower the wall temperature of a cylinder, the less the atomization of the fuel supplied to the inside of the cylinder is promoted and the greater the amount of incompletely burned fuel. For this reason, the lower the wall temperature of a cylinder, the greater the amount of PM discharged from that cylinder.

Figure 3:
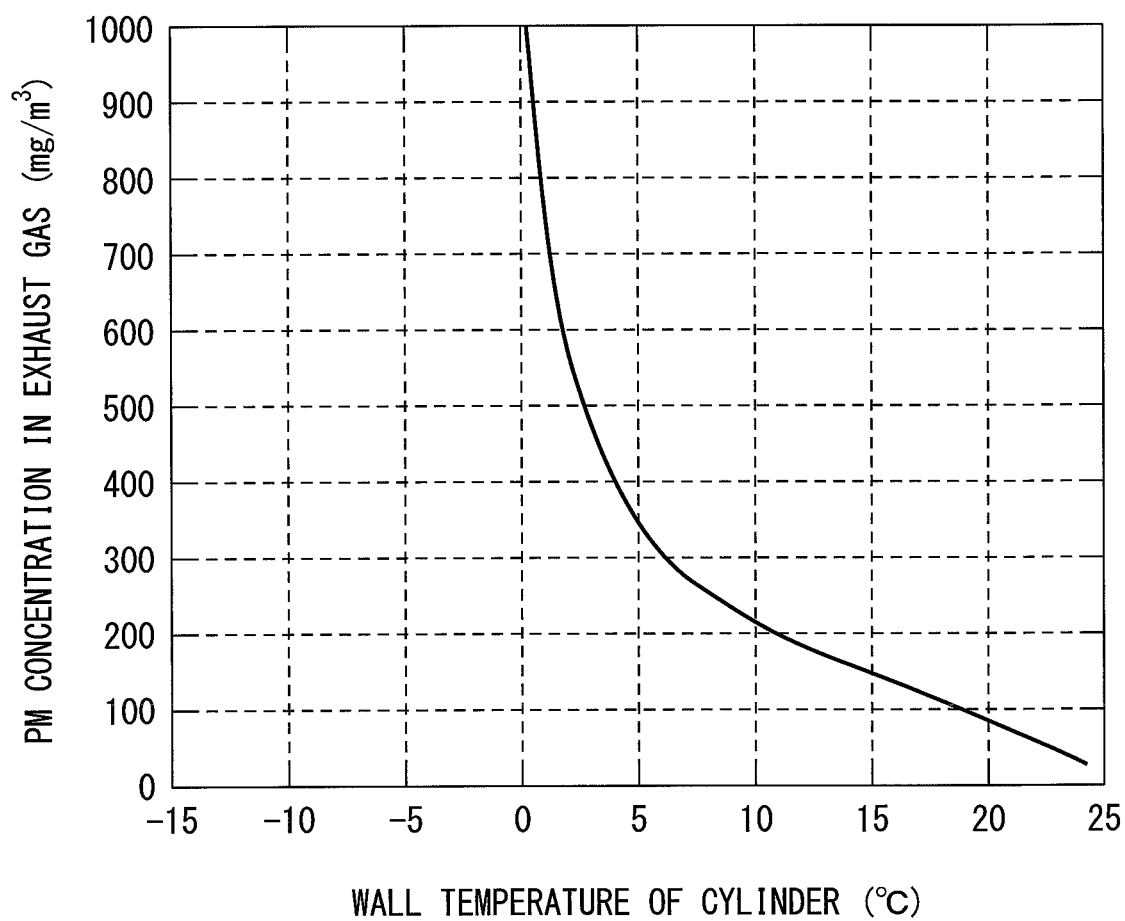
FIG. 3 is a view showing a relationship between a wall temperature of a cylinder and a PM concentration in exhaust gas discharged from that cylinder.

FIG. 3 is a view showing a relationship between a wall temperature of a cylinder and a PM concentration in exhaust gas discharged from that cylinder. As shown in FIG. 3, as the wall temperature of the cylinder becomes lower, the amount of PM discharged from that cylinder exponentially increases. Since the amount of discharge of PM is correlated with the wall temperature of the cylinder in this way, it is possible to estimate the amount of discharge of PM based on the wall temperature of the cylinder.

Figure 4:
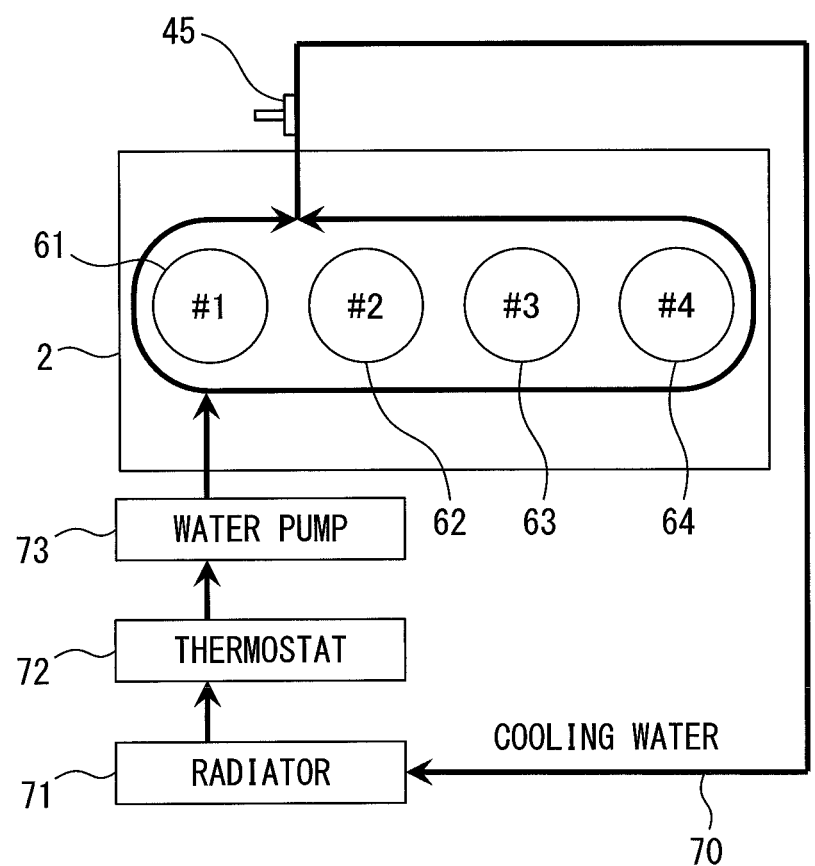
FIG. 4 is a view schematically showing a path of circulation of cooling water flowing into a cylinder block.

However, if an internal combustion engine is provided with a plurality of cylinders, sometimes the wall temperatures of the cylinders will differ. Referring to FIG. 4, the reason for this will be explained. FIG. 4 is a view schematically showing the path of circulation 70 of cooling water flowing into the cylinder block 2. The internal combustion engine in the present embodiment is a water-cooled internal combustion engine. The plurality of cylinders provided at the internal combustion engine (first cylinder 61 to fourth cylinder 64) are cooled by the cooling water (coolant).

In the path of circulation 70 of the cooling water, a radiator 71, thermostat 72, and water pump 73 are arranged. The radiator 71 uses the running air etc., when the vehicle mounting the internal combustion engine is running to cool the cooling water passing through the radiator 71. The thermostat 72 has a valve which changes in opening degree according to the temperature of the cooling water and changes the flow rate of the cooling water passing through the thermostat 72. The higher the temperature of the cooling water, the larger the opening degree of the valve and the greater the flow rate of the cooling water. The water pump 73 pumps cooling water so that the cooling water circulates through the path of circulation 70.

The arrow marks of FIG. 4 show the directions in which the cooling water is circulated. The cooling water flowing into the radiator 71 circulates through the path of circulation 70 in the order of the radiator 71, thermostat 72, water pump 73, and cylinder block 2.

As shown in FIG. 4, the path of circulation 70 is branched into two paths inside the cylinder block 2. One path passes through the surroundings of the first cylinder 61 while the other path passes through the surroundings of the first cylinder 61, second cylinder 62, third cylinder 63, and fourth cylinder 64. As shown in FIG. 1, in the cylinder block 2, at the surroundings of each cylinder, a water jacket 70a is formed as the path of circulation 70. The cooling water receives heat from the cylinders when passing through the water jackets 70a in the surroundings of the cylinders and cools the cylinders.

If again referring to FIG. 4, the path of circulation 70 passes through the surroundings of the plurality of cylinders, then again merges inside the cylinder block 2 and leaves the cylinder block 2. At the path of circulation 70 at the exit of the cylinder block 2, a water temperature sensor 45 is arranged. The water temperature sensor 45 detects the temperature of the cooling water flowing out from the cylinder block 2. The water temperature sensor 45 is electrically connected to the ECU 31. The output of the water temperature sensor 45 is input to the ECU 61. Specifically, the output of the water temperature sensor 45 is input through the corresponding AD converter 38 to the input port 36.

If like in the present embodiment the internal combustion engine is provided with a plurality of cylinders, the cooling water cannot be simultaneously supplied to the plurality of cylinders. In the example of FIG. 4, the cooling water cooled by the radiator 71 first passes through the surroundings the first cylinder 61, next passes through the surroundings of the second cylinder, next passes through the surroundings of the third cylinder 63, and finally passes through the surroundings of the fourth cylinder 64. At this time, the cooling water is gradually warmed by the heat received from the cylinders.

For this reason, the temperature of the cooling water when the cooling water passes through the surroundings of the cylinders becomes higher the later the cylinder in the order of being passed by the cooling water. As a result, the later the cylinder in the order of being passed by the cooling water, the smaller the cooling effect by the cooling water and the higher the wall temperature of the cylinder. In the example of FIG. 4, the wall temperature of the cylinder becomes higher in the order of the first cylinder 61, second cylinder 62, third cylinder 63, and fourth cylinder 64.

Figure 5:
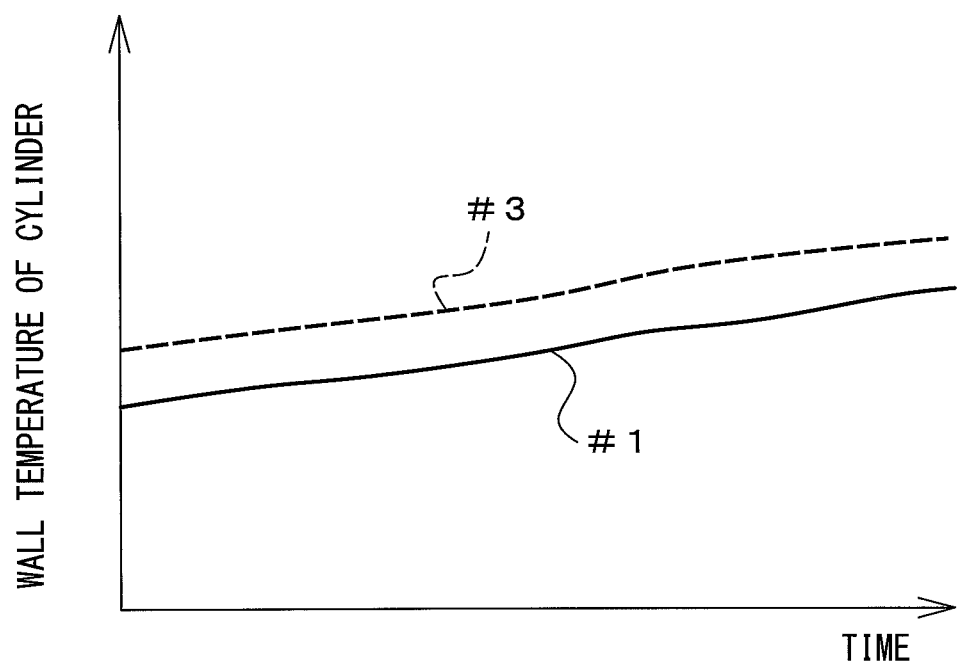
FIG. 5 is a view showing a change of wall temperatures of a first cylinder and third cylinder during warm-up of the internal combustion engine.

FIG. 5 is a view showing a change of wall temperatures of the first cylinder 61 and third cylinder 63 during warm-up of the internal combustion engine. As shown in FIG. 5, due to warm-up of the internal combustion engine, the wall temperatures of the first cylinder 61 and third cylinder 63 gradually rise. At this time, the wall temperature of the third cylinder 63 relatively late in the order of being passed by the cooling water becomes higher than the wall temperature of the first cylinder 61 relatively early in the order of being passed by the cooling water.

Since the wall temperatures of the plurality of cylinders have the above such a tendency, if the wall temperature of a single cylinder is used to calculate the total amount of PM discharge, the precision of calculation will drop due to the difference in wall temperatures among the cylinders. For this reason, in the present embodiment, the wall temperature calculation part 51 calculates or detects the wall temperatures of a predetermined number of equal to or more than two cylinders among the plurality of cylinders (first cylinder 61 to fourth cylinder 64) while the PM amount calculation part 52 calculates the total amount of PM discharge based on the wall temperatures calculated or detected by the wall temperature calculation part 51. By doing this, it is possible to reduce the effect of the difference in wall temperatures among the cylinders and in turn possible to improve the precision of calculation of the total amount of PM discharge.

Further, the PM amount calculation part 52 calculates the amount of PM deposited on the filter 23 (below, referred to as the "amount of PM deposition") based on the total amount of PM discharge. For example, the PM amount calculation part 52 calculates the total amount of PM discharge for each cycle and cumulatively adds the total amounts of PM discharge to calculate the amount of PM deposition.

On the other hand, as explained above, if the filter 23 is supplied with oxygen when the temperature of the filter 23 is high, the PM deposited on the filter 23 will be oxidized and be burned off. Further, in the internal combustion engine, when a predetermined condition for execution is satisfied, fuel cut control is performed for stopping the supply of fuel to the plurality of cylinders provided at the internal combustion engine. The predetermined condition for execution is, for example, satisfied when the amount of depression of the accelerator pedal 42 is zero or substantially zero (that is, the engine load is zero or substantially zero) and the engine speed is equal to or more than a predetermined speed higher than the speed at the time of idling.

For this reason, the PM amount calculation part 52 reduces the amount of PM deposition by exactly a predetermined amount if fuel cut control is performed when the temperature of the filter 23 is equal to or more than a predetermined temperature. The temperature of the filter 23 is, for example, calculated based on the output of the temperature sensor 41.

The engine control part 53 controls the internal combustion engine based on the amount of PM deposition calculated by the PM amount calculation part 52. If regenerating the filter 23 when the amount of PM deposition is large, the temperature of the filter 23 will excessively rise and the filter 23 is liable to deteriorate. For this reason, for example, the engine control part 53 limits the output of the internal combustion engine to keep down the rise in exhaust temperature when the amount of PM deposition is equal to or more than a predetermined amount. Note that, the engine control part 53 may prohibit fuel cut control or limit the continuous time of performance of fuel cut control when the amount of PM deposition is equal to or more than a predetermined amount.

Further, if the amount of PM deposition becomes greater, the filter 23 will clog and the back pressure will rise. For this reason, the engine control part 53 may regenerate the PM so as to quickly reduce the amount of PM deposition if the amount of PM deposition is equal to or more than a predetermined amount. Specifically, the engine control part 53 may perform lean control where the target air-fuel ratio of the air-fuel mixture supplied to the combustion chambers 5 is set to a lean air-fuel ratio leaner than the stoichiometric air-fuel ratio when the amount of PM deposition is equal to or more than a predetermined amount. If lean control is performed, oxygen is supplied to the filter 23 and the combustion of the PM is promoted.

<Processing for Calculation of Amount of PM Discharge>

Figure 6:
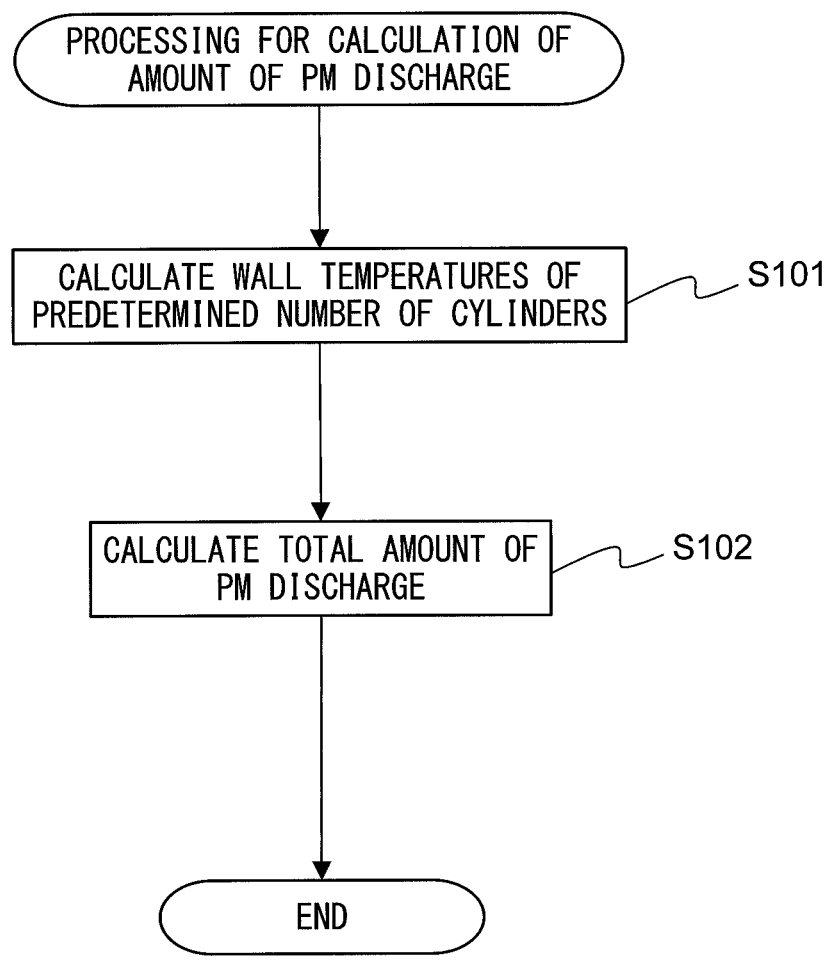
FIG. 6 is a flow chart showing a control routine of processing for calculation of the amount of PM discharge in the first embodiment of the present invention.

Below, referring to the flow chart of FIG. 6, control for calculating the total amount of PM discharge will be explained in detail. FIG. 6 is a flow chart showing a control routine of processing for calculation of the amount of PM discharge in the first embodiment of the present invention. The present control routine is repeatedly preformed by the ECU 31 at predetermined time intervals. The predetermined interval for execution is for example the time of one cycle of the internal combustion engine.

First, at step S101, the wall temperature calculation part 51 calculates the wall temperatures of a predetermined number of equal to or more than two cylinders among the plurality of cylinders provided at the internal combustion engine. If the cylinders are cooled by the cooling water, the heat resistance R between the wall of a cylinder and the cooling water is expressed by the following formula:

$$R = (Tw - Tc)/Qw \quad (1)$$

where, Tw is the wall temperature of a cylinder, Tc is the temperature of the cooling water passing through the surroundings of a cylinder (below, referred to as the "surrounding water temperature"), and Qw is the amount of heat generated by combustion of the air-fuel mixture in a cylinder.

The above formula (1) is converted to the following formula (2):

$$Tw = Qw \cdot R + Tc \quad (2)$$

For example, the wall temperature calculation part 51 uses the above-mentioned formula (2) to calculate the wall temperature Tw based on the amount of heat generated Qw, heat resistance R, and surrounding water temperature Tc. The surrounding water temperature Tc becomes a different value for each cylinder, therefore the wall temperature Tw is calculated for each of a predetermined number of cylinders. The amount of heat generated Qw, heat resistance R, and surrounding water temperature Tc are calculated as follows:

The amount of heat generated Qw becomes larger the larger the amount of intake air. For this reason, the wall temperature calculation part 51 uses a map or calculation formula to calculate the amount of heat generated Qw based on the amount of intake air. The amount of intake air is detected by the air flow meter 40.

The heat resistance R becomes smaller the larger the flow rate of the cooling water. Further, the flow rate of the cooling water becomes larger the higher the speed of the water pump 73 and becomes larger the larger the opening degree of the thermostat 72. Furthermore, the speed of the water pump 73 becomes higher the higher the engine speed while the opening degree of the thermostat 72 becomes larger the higher temperature of the cooling water. Therefore, the heat resistance R becomes smaller the higher the engine speed and becomes smaller the higher the temperature of the cooling water. For this reason, the wall temperature calculation part 51 uses a map or calculation formula to calculate the heat resistance R based on the engine speed and temperature of the cooling water. The engine speed is calculated based on the output of the crank angle sensor 44. The temperature of the cooling water is detected by the water temperature sensor 45.

Note that, if a speed sensor for detecting the speed of the water pump 73 is provided, instead of the engine speed, it is also possible to use the speed of the water pump 73 to calculate the heat resistance R. Further, if an opening degree sensor for detecting the opening degree of the thermostat 72 is provided, instead of the temperature of the cooling water, it is also possible to use the opening degree of the thermostat 72 to calculate the heat resistance R. Further, if the flow rate sensor detecting the flow rate of the cooling water is provided, the heat resistance R may be calculated based on the flow rate of the cooling water detected by the flow rate sensor.

Figure 7:
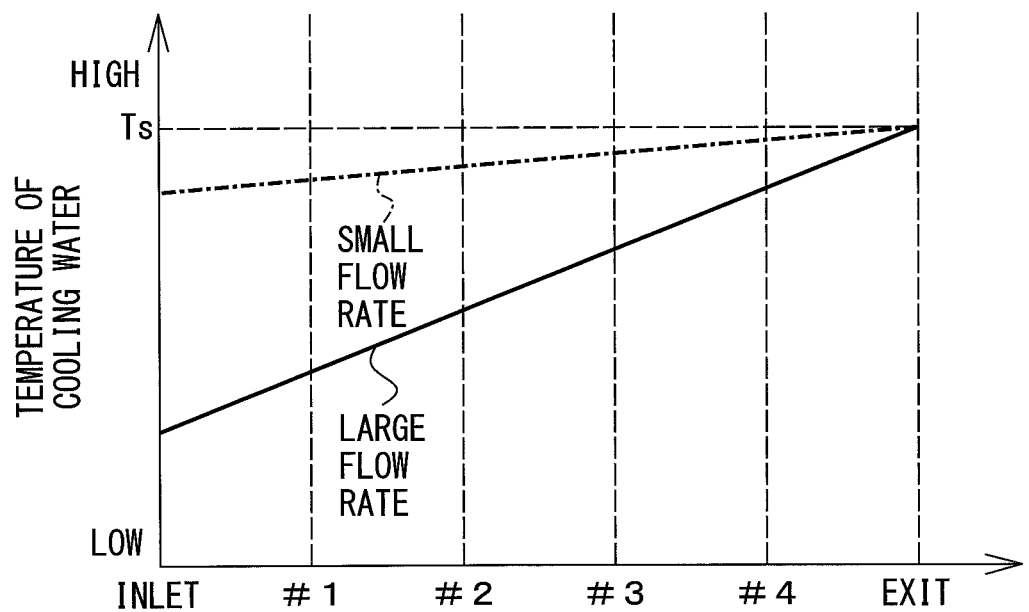
FIG. 7 is a view showing a relationship between a flow rate of cooling water and temperature of cooling water.

FIG. 7 is a view showing a relationship between a flow rate of cooling water and temperature of cooling water. FIG. 7 shows the temperatures of the cooling water at different positions of the path of circulation 70 (inlet of cylinder block 2, surroundings of first cylinder 61, surroundings of second cylinder 62, surroundings of third cylinder 63, surroundings of fourth cylinder 64, and exit of cylinder block 2). In the present embodiment, the water temperature sensor 45 is arranged at the exit of the cylinder block 2, therefore the temperature of the cooling water Ts at the exit of the cylinder block 2 is detected by the water temperature sensor 45.

As shown in FIG. 7, the temperature of the cooling water in the surroundings of each cylinder becomes higher the higher the temperature of the cooling water Ts detected by the water temperature sensor 45 and becomes higher the smaller the flow rate of the cooling water. Further, the temperature of the cooling water becomes higher in the order of the first cylinder 61, second cylinder 62, third cylinder 63, and fourth cylinder 64 and the temperature difference among the cylinders becomes larger the larger the flow rate of the cooling water.

For this reason, the wall temperature calculation part 51 uses a map or calculation formula to calculate the flow rate of the cooling water based on the engine speed and temperature of the cooling water. Further, the wall temperature calculation part 51 uses a map or calculation formula to calculate the surrounding water temperature Tc for each cylinder based on the temperature of the cooling water detected by the water temperature sensor 45 and the flow rate of the cooling water.

Note that, if a speed sensor detecting the speed of the water pump 73 is provided, instead of the engine speed, it is also possible to use the speed of the water pump 73 to calculate the flow rate of the cooling water. Further, if an opening degree sensor detecting an opening degree of the thermostat 72 is provided, instead of the temperature of the cooling water, it is also possible to use the opening degree of the thermostat 72 to calculate the flow rate of the cooling water. Further, if a flow rate sensor detecting the flow rate of the cooling water is provided, the wall temperature calculation part 51 may use a map or calculation formula to calculate the surrounding water temperature Tc for each cylinder based on the temperature of the cooling water detected by the water temperature sensor 45 and the flow rate of the cooling water detected by the flow rate sensor.

Further, the wall temperature calculation part 51 may use a map or calculation formula created for each cylinder to calculate the wall temperature for each cylinder based on the amount of intake air, the engine speed, and the temperature of the cooling water detected by the water temperature sensor 45. Further, the wall temperature calculation part 51 may also use a model formula etc. different from the above formula (1) to calculate the wall temperature of each cylinder.

Next, at step S102, the PM amount calculation part 52 calculates the total amount of PM discharge based on the wall temperatures of a predetermined number of cylinders calculated at step S101. For example, the PM amount calculation part 52 calculates the total amount of PM discharge TPM by the following formula:

$$TPM = PPM \cdot Nt/Np \quad (3)$$

In the above formula (3), PPM is the amount of PM discharged from the cylinders for which the wall temperature is calculated (predetermined number of cylinders) and is calculated as the sum of the amount of PM discharge calculated for each cylinder. The amount of PM discharge for each cylinder is calculated using a map or calculation formula based on the wall temperature of the cylinder. Nt is the total number of cylinders provided at the internal combustion engine and is "4" in the present embodiment. Np is the number (predetermined number) of cylinders for which the wall temperature is calculated.

For example, if the wall temperatures of the first cylinder 61 and third cylinder 63 are calculated, the amount of PM discharge of the first cylinder 61 and the amount of PM discharge of the third cylinder 63 may be respectively calculated and 2 (4/2) may be multiplied with their sum to calculate the total amount of PM discharge TPM. Note that, a predetermined correction coefficient may be multiplied with the right side of the above formula (3).

Further, the PM amount calculation part 52 may calculate the mean value of the wall temperatures of a predetermined number of cylinders calculated at step S101 and calculate the total amount of PM discharge based on the mean value. In this case, the mean value of the wall temperature may be multiplied with a correction coefficient and the total amount of PM discharge may be calculated based on the mean value multiplied with the correction coefficient. After step S102, the present control routine ends.

Note that, wall temperature sensors detecting wall temperatures may be provided in the cylinders and, at step S101, the wall temperature calculation part 51 may use the wall temperature sensors to detect the wall temperatures of a predetermined number of cylinders. In this case, a wall temperature sensor is provided at each cylinder where the wall temperature is detected. Further, at step S101, the wall temperature calculation part 51 may calculate or detect the wall temperatures of the plurality of cylinders provided at the internal combustion engine, that is, the wall temperatures of all of the cylinders. By doing this, it is possible to eliminate the effects of the difference of wall temperatures among the cylinders and in turn possible to further improve the precision of calculation of the total amount of PM discharge.

Second Embodiment

The exhaust purification system according to a second embodiment is basically the same in configuration and control as the exhaust purification system according to the first embodiment except for the points explained below. For this reason, below, the second embodiment of the present invention will be explained centered on the parts different from the first embodiment.

As explained above, in the first embodiment, to calculate the total amount of PM discharge, the wall temperatures of a predetermined number of equal to or more than two cylinders are calculated or detected. However, when the wall temperatures of a predetermined number of cylinders are detected, it is necessary to provide expensive wall temperature sensors able to be used in the inside cylinder environment in the predetermined number of cylinders. Further, when the wall temperatures of a predetermined number of cylinders are calculated, the greater the number of cylinders for which the wall temperature is calculated, the greater the processing load of the ECU 31.

Figure 8:
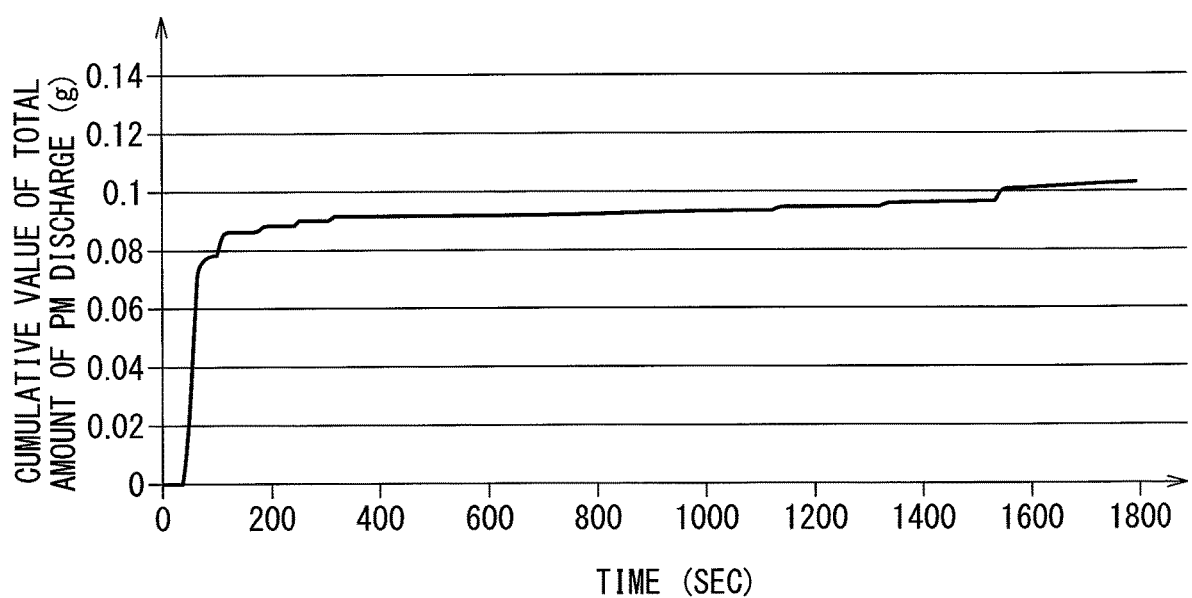
FIG. 8 is a view showing a trend along with time of a cumulative value of the total amounts of PM discharge when an internal combustion engine is started cold.

FIG. 8 is a view showing a trend along with time of a cumulative value of the total amount of PM discharge when an internal combustion engine is started cold. As shown in FIG. 8, for a predetermined time from when the internal combustion engine is started cold (in FIG. 8, about 200 seconds), the total amount of PM discharge becomes greater and the cumulative value of the total amount of PM discharge rapidly rises. On the other hand, after warm-up of the internal combustion engine, the wall temperature of the cylinder is high, and therefore the total amount of PM discharge decreases. Therefore, the majority of the PM supplied to the filter 23 is produced during warm-up of the internal combustion engine, therefore it is necessary to precisely calculate the total amount of PM discharge during warm-up of the internal combustion engine.

Further, when the amounts of change of the wall temperatures of the cylinders are large such as at the time of the warm-up of the internal combustion engine, the differences in wall temperatures among the cylinders also become larger. On the other hand, after warm-up of the internal combustion engine is completed and the wall temperatures of the cylinders converge to a certain temperature, the difference in wall temperatures among the cylinders also becomes smaller. Further, if even after warm-up of the internal combustion engine, when execution of fuel cut control etc., causes the wall temperatures of the cylinders to fall, the absolute values of the amounts of change of the wall temperatures of the cylinders become larger and the difference in wall temperatures among the cylinders also becomes larger.

For this reason, in the second embodiment, the wall temperature calculation part 51 calculates the wall temperatures of a predetermined number of cylinders so that the processing load becomes higher if judging that the absolute value of the amount of change of the wall temperature per unit time of at least one cylinder among the plurality of cylinders (below, simply referred to as "the absolute value of the amount of change of the wall temperature") is larger than a predetermined value compared to if judging that the absolute value of the amount of change of the wall temperature is smaller than a predetermined value. Specifically, the wall temperature calculation part 51 calculates the wall temperatures of a predetermined number of equal to or more than two cylinders if judging that the absolute value of the amount of change of the wall temperature is larger than a predetermined value and calculates the wall temperatures of less than the above predetermined number of cylinders among the plurality of cylinders if judging that the absolute value of the amount of change of the wall temperature is smaller than a predetermined value. By doing this, it is possible to improve the precision of calculation of the total amount of PM discharge while reducing the processing load of the ECU 31.

<Processing for Calculation of Amount of PM Discharge>

Figure 9:
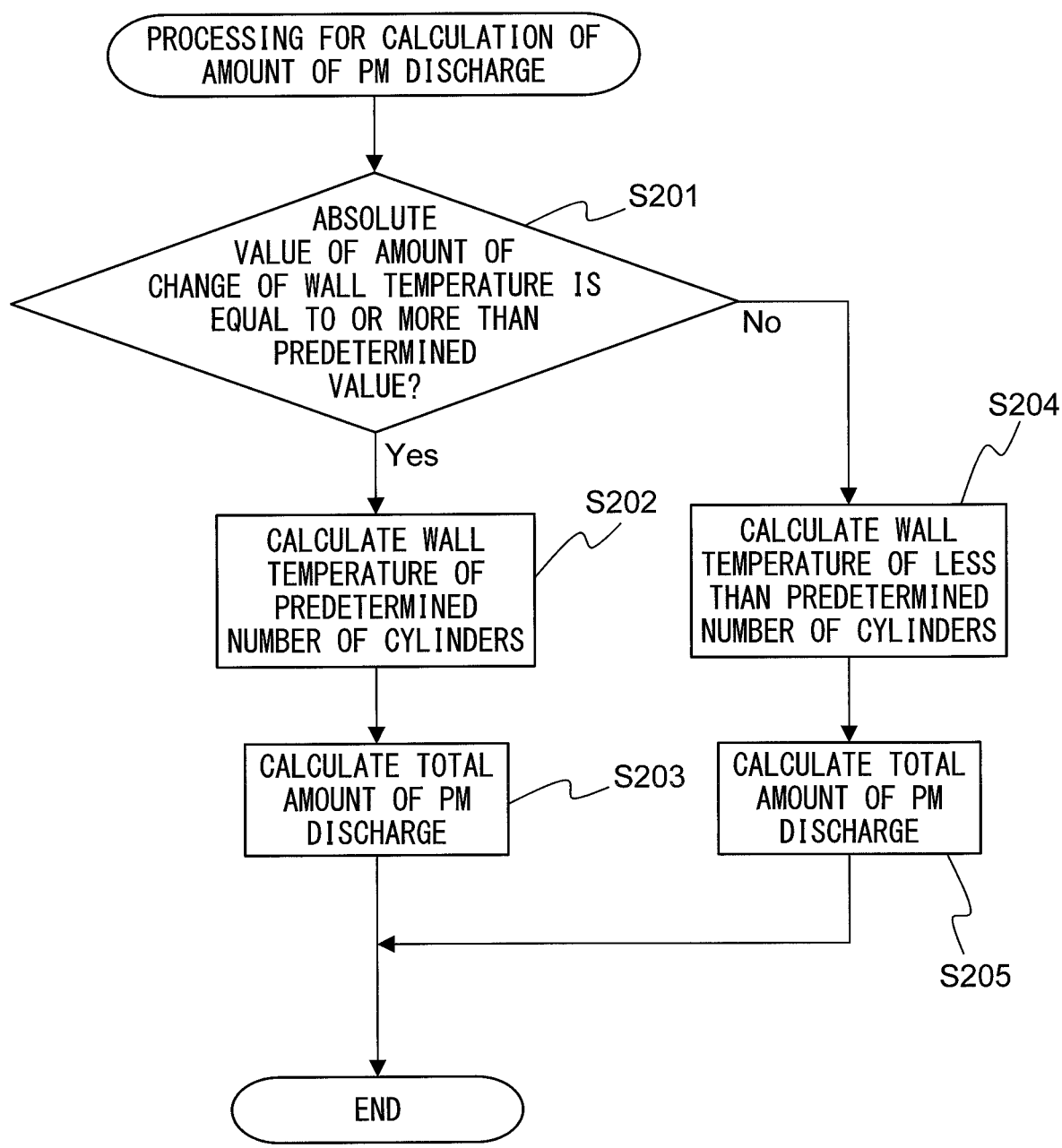
FIG. 9 is a flow chart showing a control routine of processing for calculation of the amount of PM discharge in a second embodiment of the present invention.

FIG. 9 is a flow chart showing a control routine of processing for calculation of the amount of PM discharge in the second embodiment of the present invention. The present control routine is repeatedly performed by the ECU 31 at predetermined time intervals. The predetermined interval of execution is for example the time of one cycle of the internal combustion engine.

First, at step S201, the wall temperature calculation part 51 judges whether the absolute value of the amount of change of the wall temperature is equal to or more than a predetermined value. For example, when warm-up of the internal combustion engine has not been completed, the wall temperature calculation part 51 judges that the absolute value of the amount of change of the wall temperature is equal to or more than a predetermined value, while when warm-up of the internal combustion engine has been completed, it judges that the absolute value of the amount of change of the wall temperature is less than a predetermined value. For example, when the temperature of the cooling water has not reached a predetermined temperature, the wall temperature calculation part 51 judges that warm-up of the internal combustion engine has not been completed and judges that the absolute value of the amount of change of the wall temperature is equal to or more than a predetermined value. Further, the wall temperature calculation part 51 may judge that warm-up of the internal combustion engine has not been completed and judge that the absolute value of the amount of change of the wall temperature is equal to or more than a predetermined value when the time elapsed from when the internal combustion engine was started up has not reached a predetermined time.

If at step S201 it is judged that the absolute value of the amount of change of the wall temperature is equal to or more than a predetermined value, the present control routine proceeds to step S202. At step S202, in the same way as step S101 of FIG. 7, the wall temperature calculation part 51 calculates the wall temperatures of a predetermined number of equal to or more than two cylinders among the plurality of cylinders provided at the internal combustion engine.

Next, at step S203, the PM amount calculation part 52, in the same way as step S102 of FIG. 7, calculates the total amount of PM discharge based on the wall temperatures of a predetermined number of cylinders calculated at step S202. After step S203, the present control routine ends.

On the other hand, if at step S201 it is judged that the absolute value of the amount of change of the wall temperature is less than a predetermined value, the present control routine proceeds to step S204. At step S204, by a method similar to step S101 of FIG. 7, the wall temperature calculation part 51 calculates the wall temperatures of less than the predetermined number of cylinders among the plurality of cylinders provided at the internal combustion engine.

Next, at step S205, the PM amount calculation part 52 uses a method similar to step S102 of FIG. 7 to calculate the total amount of PM discharge based on the wall temperatures of less than the predetermined number of cylinders calculated at step S204. After step S205, the present control routine ends.

Note that, at step S201, the wall temperature calculation part 51 may judge that the absolute value of the amount of change of the wall temperature is equal to or more than a predetermined value if fuel cut control is performed continuously for equal to or more than a predetermined time, and judge that the absolute value of the amount of change of the wall temperature is less than the predetermined value if fuel cut control is not performed continuously for equal to or more than the predetermined time. Further, it is also possible that the wall temperature sensor is provided inside one cylinder and, at step S201, the wall temperature calculation part 51 judges whether the absolute value of the amount of change of the wall temperature detected by the wall temperature sensor is equal to or more than a predetermined value.

Further, in the present control routine, the wall temperature calculation part 51 calculates the wall temperatures of a predetermined number of equal to or more than two cylinders if judging that the absolute value of the amount of change of the wall temperature is equal to or more than a predetermined value, and calculates the wall temperatures of less than the above predetermined number of cylinders among the plurality of cylinders if judging that the absolute value of the amount of change of the wall temperature is smaller than the predetermined value. However, the wall temperature calculation part 51 may calculate the wall temperatures of a predetermined number of equal to or more than two cylinders if judging that the absolute value of the amount of change of the wall temperature is larger than a predetermined value, and calculate the wall temperatures of less than the above predetermined number of cylinders among the plurality of cylinders if the absolute value of the amount of change of the wall temperature is equal to or less than the predetermined value. That is, at step S201, the wall temperature calculation part 51 may judge whether the absolute value of the amount of change of the wall temperature is larger than a predetermined value.

Further, the wall temperature calculation part 51 may calculate the wall temperatures of the plurality of cylinders (all cylinders) at step S202 and calculate the wall temperature of one cylinder among the plurality of cylinders at step S204. By doing this, it is possible to further improve the precision of calculation of the total amount of PM discharge when the difference in wall temperatures among the cylinders is large and possible to further raise the effect of reduction of the processing load of the ECU 31.

If the internal combustion engine is provided with equal to or more than three cylinders, one cylinder among the plurality of cylinders is, for example, set as a cylinder other than the cylinder which the cooling water first passes and the cylinder which the cooling water last passes, that is, a cylinder other than the cylinder where the wall temperature is the lowest and the cylinder where the wall temperature is the highest. By doing this, it is possible to use a value close to the mean value of the wall temperatures of all of the cylinders to calculate the total amount of PM discharge and possible to keep the precision of calculation from falling when calculating the total amount of PM discharge based on the wall temperature of one cylinder.

For example, if like the present embodiment, four cylinders arranged in series are provided at the internal combustion engine, one cylinder among the plurality of cylinders is set as the second cylinder 62 which the cooling water passes second or the third cylinder 63 which the cooling water passes third. Further, the lower the wall temperature of the cylinder, the greater the total amount of PM discharge calculated based on the wall temperature. For this reason, preferably one cylinder among the plurality of cylinders is set as the second cylinder 62. By doing this, it is possible to keep the total amount of PM discharge from being calculated smaller than the true value.

Third Embodiment

The exhaust purification system according to a third embodiment is basically the same in configuration and control as the exhaust purification system according to the second embodiment except for the points explained below. For this reason, below, the third embodiment of the present invention will be explained centered on the parts different from the second embodiment.

In the third embodiment as well, the wall temperature calculation part 51 calculates the wall temperatures of a predetermined number of cylinders so that the processing load becomes higher if it judges that the absolute value of the amount of change of the wall temperature is greater than a predetermined value compared to if it judges that the absolute value of the amount of change of the wall temperature is smaller than the predetermined value. Specifically, the wall temperature calculation part 51 uses a method of processing with a relatively high processing load to calculate the wall temperatures of a predetermined number of equal to or more than two cylinders if it is judged that the absolute value of the amount of change of the wall temperature is greater than a predetermined value and uses a method of processing with a relatively low processing load to calculate the wall temperatures of the predetermined number of cylinders if it is judged that the absolute value of the amount of change of the wall temperature is smaller than the predetermined value. By doing this, it is possible to improve the precision of calculation of the total amount of PM discharge while reducing the processing load of the ECU 31.

<Processing for Calculation of Amount of PM Discharge>

Figure 10:
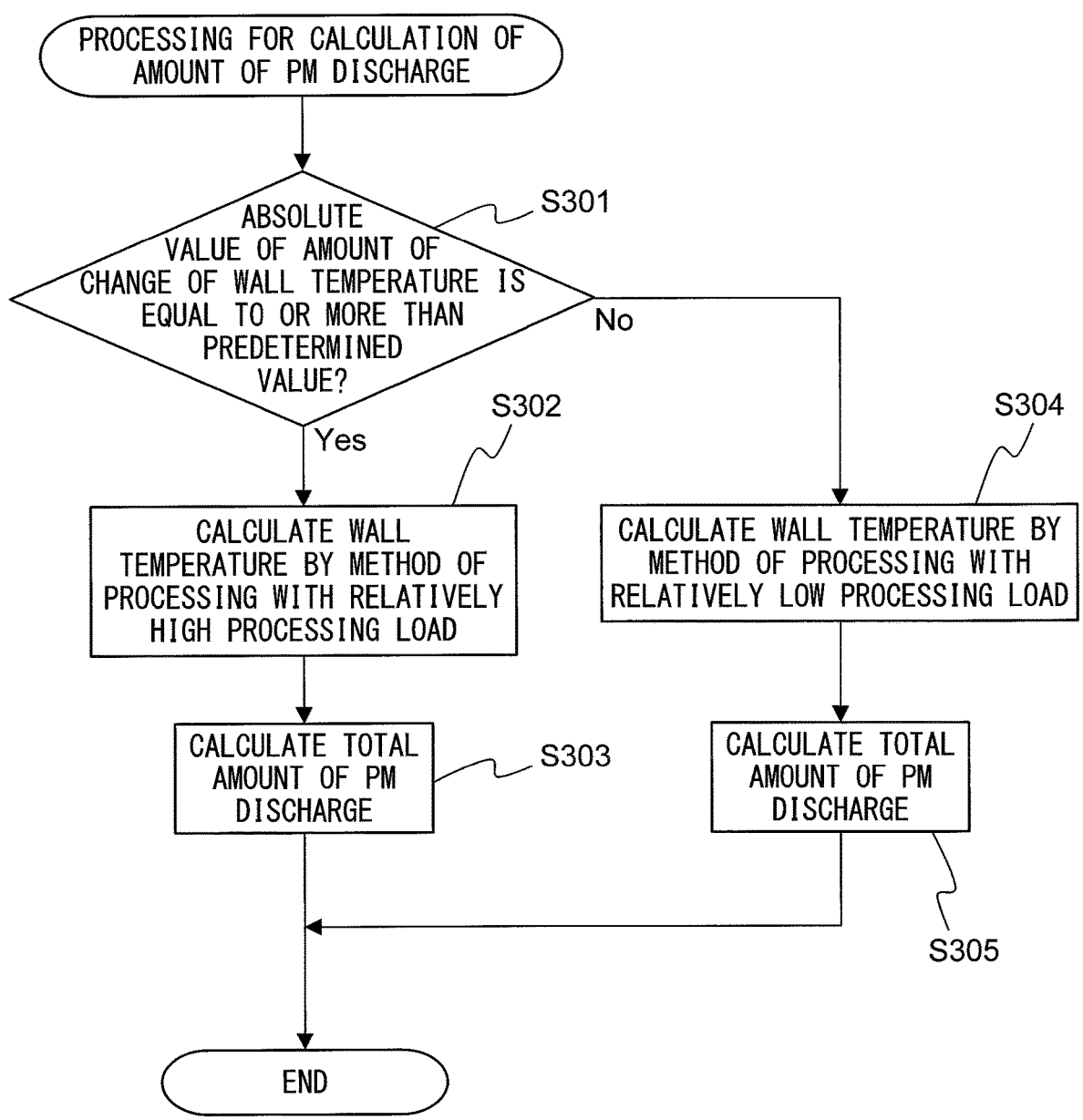
FIG. 10 is a flow chart showing a control routine of processing for calculation of the amount of PM discharge in a third embodiment of the present invention.

FIG. 10 is a flow chart showing a control routine of processing for calculation of the amount of PM discharge in the third embodiment of the present invention. The present control routine is repeatedly performed by the ECU 31 at predetermined time intervals. The predetermined interval of execution is, for example, the time of one cycle of the internal combustion engine.

First, at step S301, in the same way as step S201 of FIG. 9, the wall temperature calculation part 51 judges whether the absolute value of the amount of change of the wall temperature is equal to or more than a predetermined value. If it is judged that the absolute value of the amount of change of the wall temperature is equal to or more than the predetermined value, the present control routine proceeds to step S302.

At step S302, the wall temperature calculation part 51 uses a method with a relatively high processing load to calculate the wall temperatures of a predetermined number of cylinders. Specifically, the wall temperature calculation part 51, in the same way as step S101 of FIG. 7, calculates the wall temperatures of the predetermined number of cylinders.

Next, at step S303, the PM amount calculation part 52, in the same way as step S102 of FIG. 7, calculates the total amount of PM discharge based on the wall temperatures of the predetermined number of cylinders calculated at step S302. After step S303, the present control routine ends.

On the other hand, if at step S301 it is judged that the absolute value of the amount of change of the wall temperature is less than the predetermined value, the present control routine proceeds to step S304. At step S304, the wall temperature calculation part 51 uses a method of processing with a relatively low processing load to calculate the wall temperatures of the predetermined number of cylinders.

For example, the wall temperature calculation part 51 uses a method similar to step S101 to calculate the wall temperature of one cylinder and adds a predetermined offset amount determined for each cylinder to this wall temperature to thereby calculate the wall temperature of another cylinder. For example, if a method similar to step S101 is used to calculate the wall temperature of the third cylinder 63, the offset amounts of the first cylinder 61 and the second cylinder 62 become negative and the offset amount of the fourth cylinder 64 becomes positive. Note that, the wall temperature sensor may be provided inside one cylinder and predetermined offset amounts may be added to the wall temperature detected by the wall temperature sensor to calculate the wall temperatures of the other cylinders.

Next, at step S305, the PM amount calculation part 52, in the same way as step S102 of FIG. 7, calculates the total amount of PM discharge based on the wall temperatures of the predetermined number of cylinders calculated at step S304. After step S305, the present control routine ends.

Note that, at step S302 and step S304, the wall temperature calculation part 51 may calculate the wall temperatures of the plurality of cylinders (all cylinders). By doing this, the precision of calculation of the total amount of PM discharge can be further improved. Further, the present control routine can be modified in the same way as the control routine of FIG. 9.

Other Embodiments

Above, preferred embodiments according to the present invention were explained, but the present invention is not limited to these embodiments. Various corrections and changes may be made within the language of the claims.

For example, the configuration of the internal combustion engine is not limited to the above-mentioned configuration. Therefore, the specific configuration of the internal combustion engine such as the cylinder array, mode of injection of fuel, configuration of intake and exhaust systems, configuration of valve operating mechanism, and presence of any supercharger may differ from the configuration shown in FIG. 1. For example, the fuel injector 11 may be configured to inject fuel into the intake port 7. Further, the catalyst 20 may be omitted.

Further, the thermostat 72 may be arranged in the path of circulation 70 between the cylinder block 2 and the radiator 71. Further, the water temperature sensor 45 may be arranged at another position in the path of circulation 70 so long as able to detect the temperature of the cooling water.

Further, the internal combustion engine may be a compression ignition type internal combustion engine (diesel engine). In this case, for example, in the exhaust passage of the internal combustion engine, an oxidation catalyst is arranged as a catalyst 20 and a diesel particulate filter (DPF) is arranged as the filter 23.

Further, the above-mentioned embodiments can be freely combined to be worked. For example, if the second embodiment and the third embodiment are combined, at step S204 of FIG. 9, the wall temperature calculation part 51 may use a method similar to step S304 of FIG. 10 to calculate the wall temperatures of less than the predetermined number of cylinders by a method of processing with a relatively low processing load.

REFERENCE SIGNS LIST

22 exhaust pipe
23 filter
51 wall temperature calculation part
52 PM amount calculation part
61 first cylinder
62 second cylinder
63 third cylinder
64 fourth cylinder

The invention claimed is:

1. An exhaust purification system of an internal combustion engine comprising:
   a filter arranged in an exhaust passage of an internal combustion engine in which a plurality of cylinders cooled by cooling water are provided and trapping particulate matter in exhaust gas;
   a wall temperature calculation part configured to calculate or detect wall temperatures of a predetermined number of equal to or more than two cylinders among the plurality of cylinders; and
   a PM amount calculation part configured to calculate an amount of particulate matter discharged from the plurality of cylinders to the exhaust passage based on the wall temperatures calculated or detected by the wall temperature calculation part.

2. The exhaust purification system of an internal combustion engine according to claim 1, wherein the wall temperature calculation part is configured to calculate or detect the wall temperatures of the plurality of cylinders.

3. The exhaust purification system of an internal combustion engine according to claim 1, wherein the wall temperature calculation part is configured to calculate the wall temperatures of the predetermined number of cylinders so that processing load becomes higher if judging that an absolute value of an amount of change of the wall temperature per unit time of at least one cylinder among the plurality of cylinders is larger than a predetermined value, compared to if judging that the absolute value is smaller than the predetermined value.

4. The exhaust purification system of an internal combustion engine according to claim 3, wherein the wall temperature calculation part is configured to calculate the wall temperatures of the predetermined number of cylinders if judging that the absolute value is larger than the predetermined value and calculate the wall temperatures of less than the predetermined number of cylinders among the plurality of cylinders if judging that the absolute value is smaller than the predetermined value.

5. The exhaust purification system of an internal combustion engine according to claim 4, wherein the wall temperature calculation part is configured to calculate the wall temperatures of the plurality of cylinders if judging that the absolute value is larger than the predetermined value and calculate the wall temperature of one cylinder among the plurality of cylinders if judging that the absolute value is smaller than the predetermined value.

6. The exhaust purification system of an internal combustion engine according to claim 5, wherein the internal combustion engine is provided with equal to or more than three cylinders and one cylinder among the plurality of cylinders is a cylinder other than the cylinder which the cooling water first passes and the cylinder which the cooling water last passes.

7. The exhaust purification system of an internal combustion engine according to claim 3, wherein the wall temperature calculation part is configured to calculate the wall temperatures of the predetermined number of cylinders by a method of processing with a relatively high processing load if judging that the absolute value is larger than the predetermined value and calculate the wall temperatures of the predetermined number of cylinders by a method of processing with a relatively low processing load if judging that the absolute value is smaller than the predetermined value.

8. The exhaust purification system of an internal combustion engine according to claim 7, wherein the wall temperature calculation part is configured to calculate the wall temperatures of the plurality of cylinders by a method of processing with a relatively high processing load if judging that the absolute value is larger than the predetermined value and calculate the wall temperatures of the plurality of cylinders by a method of processing with a relatively low processing load if judging that the absolute value is smaller than the predetermined value.

9. The exhaust purification system of an internal combustion engine according to claim 3, wherein the wall temperature calculation part is configured to judge that the absolute value of the amount of change of the wall temperature per unit time of the at least one cylinder is larger than the predetermined value if warm-up of the internal combustion engine has not been completed.

10. The exhaust purification system of an internal combustion engine according to claim 3, wherein the wall temperature calculation part is configured to judge that the absolute value of the amount of change of the wall temperature per unit time of the at least one cylinder is larger than the predetermined value if fuel cut control for stopping supply of fuel to the plurality of cylinders is performed continuously for equal to or more than a predetermined time.

11. An exhaust purification system of an internal combustion engine comprising:
a filter arranged in an exhaust passage of an internal combustion engine in which a plurality of cylinders cooled by cooling water are provided and trapping particulate matter in exhaust gas; and
an electronic control unit, wherein
the electronic control unit is configured to calculate or detect wall temperatures of a predetermined number of equal to or more than two cylinders among the plurality of cylinders; and calculate an amount of particulate matter discharged from the plurality of cylinders to the exhaust passage based on the wall temperatures.

* * * * *